United States Patent [19]

Payne

[11] Patent Number: 5,670,093
[45] Date of Patent: Sep. 23, 1997

[54] FLUID DISTRIBUTION SYSTEM AND METHOD UTILIZING A RADIAL SPLITTER

[75] Inventor: Richard L. Payne, McKinney, Tex.

[73] Assignee: Atlantic Richfield Company, Los Angeles, Calif.

[21] Appl. No.: 601,200

[22] Filed: Feb. 14, 1996

[51] Int. Cl.$^6$ ............................................. B01F 3/04
[52] U.S. Cl. .................. 261/20; 261/76; 261/DIG. 75; 166/274
[58] Field of Search .................. 261/20, DIG. 75, 261/76; 166/274, 275

[56] References Cited

U.S. PATENT DOCUMENTS

| | | | |
|---|---|---|---|
| 4,370,304 | 1/1983 | Hendriks et al. | 261/DIG. 75 |
| 4,477,393 | 10/1984 | Kos | 261/DIG. 75 |
| 4,587,064 | 5/1986 | Blum | 261/DIG. 75 |
| 4,602,391 | 7/1986 | Shepherd | 261/DIG. 75 |
| 4,639,313 | 1/1987 | Zipperian | 261/DIG. 75 |
| 4,824,614 | 4/1989 | Jones | 261/76 |
| 5,078,921 | 1/1992 | Zipperian | 261/DIG. 75 |
| 5,421,408 | 6/1995 | Stoisits et al. | 166/274 |

OTHER PUBLICATIONS

Jeff Jones & R.L. Williams, *A Two-Phase-Flow Splitting Device That Works*, Aug. 1993.

*Primary Examiner*—Tim R. Miles
*Attorney, Agent, or Firm*—David L. McCombs; Warren B. Kice

[57] ABSTRACT

A system for distributing a fluid to a plurality of locations, in which a first conduit is provided receiving the fluid and a splitter is provided having a housing in flow communication with the first conduit for receiving the fluid. At least two branch conduits extend from the first conduit and parallel to the axis of the housing for respectively receiving portions of said fluid.

12 Claims, 1 Drawing Sheet

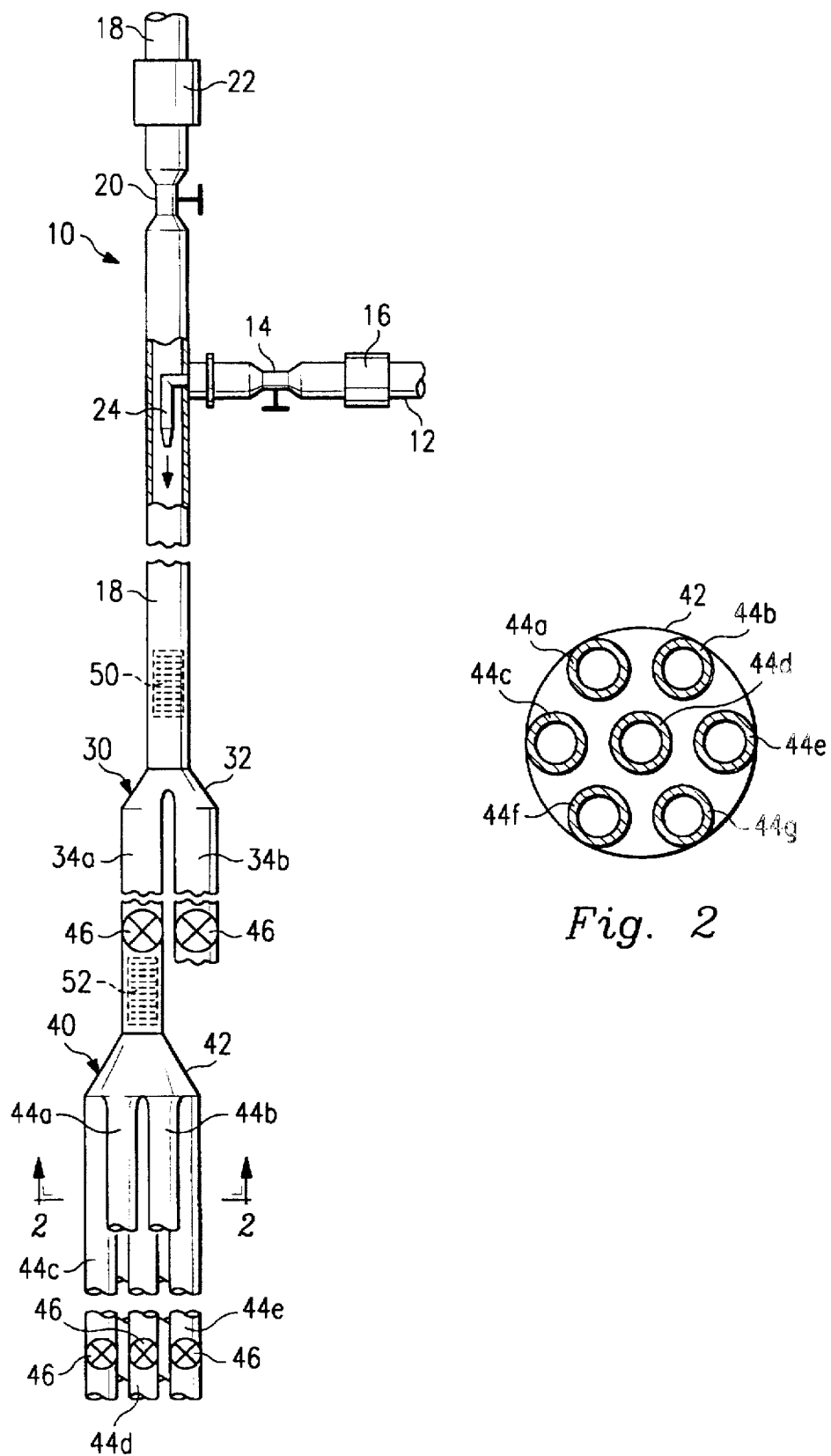

FLUID DISTRIBUTION SYSTEM AND METHOD UTILIZING A RADIAL SPLITTER

BACKGROUND OF THE INVENTION

The present invention relates to a system and method for distributing a fluid and, more particularly, to such a system and method utilizing a radial splitter for distributing a multiphase fluid to a plurality of locations.

There are many applications for distributing a multiphase fluid to a plurality of locations. For example, gases produced from subterranean earth formations are often reinjected into the formation for storing the gases for future production and/or for stimulating the production of hydrocarbon liquids such as crude oil. In some of these applications, it is desirable to control the flow of the gas to slow down the migration of the gas into the oil formation and the flow of the gas back to the surface. To this end, gas, along with a liquid, such as water, have been alternatively injected into the formation. However, the cost of providing separate liquid and gas injection piping networks leading to each injection well is significant.

Accordingly, techniques evolved for simultaneously injecting liquid and gas into the earth formations through injection wells. However, in these systems it is difficult to obtain a uniform distribution of the gas and liquid mixture especially when the mixture must be transported long distances through piping networks and manifolds. This problem is addressed in the system disclosed in U.S. Pat. No. 5,421,408, assigned to the assignee of the present invention. According to this system, the gas is injected into a conduit carrying liquid and the ensuing mixture is conducted to branch conduits located at the drill sites. The branch conduits respectively extend to manifolds at the proximate location of the production wells, and a plurality of additional branch conduits are connected to the manifold in a spaced relation and extend to the wells.

Although this arrangement essentially solved the problems with the prior art systems discussed above, it was limited to "T" type splitters which can deliver equal-phase mixtures, i.e., mixtures with equal ratios of gas and liquid, to all of the wells, for a range of flow rates to each well. However, when the flow rate requirements for each well varied, as is often the case, the ratio of the gas to the liquid changed at each branch conduit due to the varying effects of momentum and gravity on the liquid and the gases. Although other systems have been proposed to maintain equal gas/liquid ratios at each branch conduit, their performance drops off considerably at relative low velocities.

Therefore, what is needed is a system and method in which the flow can be split into a plurality of streams without changing the gas/liquid ratio when the flow rate requirements for each well varies and at relatively low velocities.

SUMMARY OF THE INVENTION

The present invention, accordingly, provides an apparatus and method that retains all of the advantages of the system and method of the above-mentioned patent while enabling substantially equal gas/liquid ratios at each branch conduit to be maintained, even when the flow requirements through each branch conduit vary and even at relative low velocities. To this end, a radial splitter is disposed in the conduit carrying the gas/liquid mixture to the drill sites and in the conduits carrying the mixture from the drill sites to the production wells. Each splitter includes a housing having an inlet in flow communication with the conduit for receiving the fluid, and at least two branch conduits extending from the housing for splitting the fluid and respectively receiving portions of the fluid. The axes of the branch conduits extend in a spaced, parallel relation to the axis of the first-mentioned conduit to reduce the effect of momentum on the predetermined gas/liquid ratio of the mixture as it passes through the housing.

An advantage achieved with the present invention is that it enables substantially equal gas/liquid ratios to be maintained at each branch location even when the flow requirements at the locations vary.

Another advantage achieved with the present invention is that it enables the above to be achieved when operating at relative low velocities.

BRIEF DESCRIPTION OF THE DRAWINGS

FIG. 1 is a schematic representation of the system of the present invention.

FIG. 2 is an enlarged sectional view taken along the line 2—2 of FIG. 1.

DESCRIPTION OF THE PREFERRED EMBODIMENTS

Referring to FIG. 1 of the drawing, the reference numeral 10 refers, in general to the system of the present invention which includes a gas supply conduit 12 having a conventional throttling valve 14 and a flowmeter 16 interposed therein. The inlet end (not shown) of the conduit, 12 is connected to a source of gas such as, for example, a gas processing and handling facility in which gas is produced from an oil field in a conventional manner.

A liquid supply conduit 18 is also provided which also has a conventional throttling valve 20 and flowmeter 22 interposed therein. The liquid may be obtained from any conventional source such as a municipal reservoir, an oil field or the like, or it may comprise treated sea liquid, for example. The liquid flows from an inlet end (not shown) of the conduit 18 in a direction indicated by the flow arrow in FIG. 1.

The gas supply conduit 12 extends at right angles to the liquid supply conduit 18 so that gas may be injected into the conduit 18 through an L-shaped nozzle 24 extending from the conduit 12 and into the conduit 18 in the same direction as the liquid flow. As a result, the gas mixes with the liquid in the conduit 18 and the mixture flows through the conduit 18 to a radial splitter 30. The splitter 30 includes a hollow body portion 32 defining an inlet end registering with the outlet end of the conduit 18. Two branch conduits 34a and 34b extend from the body portion 32 in flow communication therewith. The axis of each branch conduit 34a and 34b extends parallel to and is radially spaced from the axis of the conduit 18 a minimum mount to reduce the different effects that momentum has on the gas and the liquid as the mixture passes through the splitter 30. This, plus the fact that the splitter 30 is preferably oriented in a vertical direction to reduce the effects of gravity on the gas and liquid, enables the gas/liquid ratio to be maintained substantially the same in each branch conduit 34a and 34b. The branch conduits 34a and 34b can be formed integrally with the body member 32 or can be fabricated separately and attached to the body member in a conventional manner.

The conduits 34a and 34b respectively extend to two remote locations which, for the purposes of example, can be two drill sites. To this end, the conduit 34a is a drill site which, for the purposes of example, has seven production wells, (not shown). At the latter drill site the conduit 34a is connected to a radial splitter 40 which is identical to the splitter 30 with the exception that it is adapted to split the flow into seven equal portions, one for each well. The splitter 40 includes a hollow body portion 42 registering with the outlet end of the conduit 34a, and seven branch conduits 44a–44g (FIGS. 1 and 2) extending from the body portion in flow communication therewith. As in the case of the splitter 30, the splitter 40 is designed so that the respective axes of the conduits 44a–44g extend parallel to and are radially spaced from the axis of the conduit 18 a minimum amount. As in the case of the splitter 30 this reduces the different effects that momentum has on the gas and the liquid as the mixture passes through the splitter 40. This, plus the fact that the splitter 40 is also preferably oriented in a vertical direction to reduce the effects of gravity on the gas and liquid, enables the gas/liquid ratio to be maintained substantially the same in each branch conduit 44a–44g. Although not shown in the drawings, it is understood that the branch conduits 44a–44g respectively extend to the seven above-mentioned production wells.

It is understood that the conduit 34b also extends to a splitter (not shown) at the other drill site which splitter would function in an identical manner to the splitter 40.

A valve 46 is provided in each of the branch conduits 34a, 34b, and 44a–44g downstream of the splitter 40, with the valves associated with the conduits 44a, 44b, 44f and 44g being omitted for the convenience of presentation.

A pair of static mixers 50 and 52 are disposed in the conduits 18 and 34a just upstream of the splitters 30 and 40, respectively. The mixers 50 and 52 function in a conventional manner to homogenize the mixture before it enters the splitters 30 and 40 and their respective branch conduits. An example of the type of mixer that can be utilized is disclosed in U.S. Pat. No. 4,824,614, the disclosure of which is hereby incorporated by reference.

In operation, gas from the conduit 12 is introduced into the conduit 18 via the nozzle 24 where it mixes with the liquid flowing through the latter conduit. The valves 14 and 20 are adjusted as necessary to establish a predetermined gas-to-liquid ratio in the mixture as it flows from the conduit 18, through the mixer 50 and into the splitter 30. The mixer 50 homogenizes the mixture and the splitter 30 splits the stream of mixture into two portions while maintaining substantially the same predetermined gas-to-liquid ratio in each portion before the portions respectively pass through the branch conduits 34a and 34b to the two drill sites.

The gas/liquid mixture portion in the conduit 34a passes through the mixer 52 and to the splitter 40 located at one of the drill sites where the mixture is further split up into seven streams. By virtue of the unique design of the splitter 40 discussed above the above splitting is achieved while substantially the same predetermined gas-to-liquid ratio is maintained.

The streams are passed, via the branch conduits 44a–44g to the respective production wells where they are injected into the wells. The valves 46 enable the respective flows of the mixture through the conduits 44a–44g to be regulated in accordance with particular requirements of the wells, and to be varied when these requirements change. At each well, the mixture is distributed through well perforations opening into an earth formation so that the earth formation serves as a gas storage reservoir while permitting at least some of the gas to migrate sufficiently though the reservoir to serve as a drive fluid to increase the yield of liquid hydrocarbons from the formation through production wells.

The present invention has several advantages. For example, the provision of a two-phase mixture of gas and liquid provides better mobility and control of the gas and improved hydrocarbon recovery when compared to the technique of injecting each phase alone for a predetermined period of time. Further, the design of the radial splitters 30 and 40 enables substantially the same ratio of gas to liquid in the mixture to be maintained after the splitting, even though the respective flow rates of the mixture through the conduits 44a–44g may change. This is achieved due to the fact that the respective axes of the branch conduits associated with the splitter 30 and the branch conduits 44a–44g associated with the splitter 40 extend parallel to, and are radially spaced from the axes of the conduits 18 and 34a, respectively, and are offset from the latter axes a minimal amount. Also, the above advantages are achieved over a wider range of flow velocities when compared to the prior art designs discussed above. Another advantage is achieved by orienting the splitters 30 and 40 vertically to minimize the effects of gravity on the gas and liquid in the mixture flowing through the system.

It is understood that several variations may be made in the foregoing without departing from the scope of the invention. For example, the splitters 30 and 40 are not limited to splitting the mixture into two and seven streams as described above, but rather can be configured to split the mixture into a greater number of streams within the scope of the invention. Also, although the branch conduits 34a and 34b are shown extending directly to the splitter 40, it is understood that additional conduits can be connected between the branch conduits and the splitter. Similarly, additional conduits can be connected between the branch conduits 44a–44g and the production wells. Further, although it is preferred that the splitters 30 and 40 be oriented vertically as shown in FIG. 1 for the reasons discussed above, it is understood that other portions of the system can take a horizontal orientation and that the system of the present invention is not limited to the oil field environment discussed above but rather can be used in other applications requiring the splitting of a multiphase fluid.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A system for distributing a multiphase fluid to a plurality of locations, said system comprising a first conduit extending in a first direction for receiving a mixture of two fluids at a predetermined ratio of said fluids, a first splitter connected to said first conduit for splitting the mixture of said fluids into a first plurality of streams conducted through branch conduits extending parallel to and radially spaced from the first direction, each of said branch conduits including another splitter for splitting the mixture of fluids into another plurality of streams conducted through additional branch conduits extending parallel to and radially spaced from the first direction.

2. The system of claim 1 further comprising a mixer disposed in said conduits upstream of each of said splitters for mixing said fluid.

3. The system of claim 1 wherein said first conduit receives a first fluid, and further comprising a means for introducing a second fluid into said first conduit for forming said mixture of said fluids at said predetermined ratio.

4. A system for distributing a multiphase fluid to a plurality of drillsite locations each having a plurality of production wells, said system comprising a first conduit extending in a first direction for receiving a mixture of two fluids at a predetermined ratio of said fluids, means connected to said first conduit for splitting the mixture of said fluids into a first plurality of streams conducted through branch conduits extending parallel to and radially spaced from the first direction, each of said branch conduits including further means for splitting the mixture of fluids into another plurality of streams conducted through additional branch conduits extending parallel to and radially spaced from the first direction, and means upstream of each splitter for mixing said fluid.

5. The system of claim 4 wherein each of said splitting means comprises a housing having a single inlet and a plurality of outlets.

6. The system of claim 4 wherein said first conduit receives a first fluid, and further comprising means for introducing a second fluid into said first conduit for forming said mixture of said fluids at said predetermined ratio.

7. A method for distributing a multiphase fluid to a plurality of locations, said method comprising the steps of flowing a mixture of two fluids at a predetermined ratio of said fluids through a conduit extending in a first direction, splitting said mixture into a plurality of streams conducted through branch conduits extending parallel to and radially spaced from the first direction, and splitting the mixture of fluids again in each of the branch conduits into another plurality of streams conducted through additional branch conduits extending parallel to and radially spaced from the first direction.

8. The method of claim 7 wherein said step of forming a mixture comprises the steps of introducing a first fluid into said conduit and introducing a second fluid into said conduit for forming said mixture at said predetermined ratio.

9. The method of claim 7 further comprising the step of mixing said fluids in said conduits before each of said steps of splitting.

10. A system for distributing a multiphase fluid to a plurality of drillsite locations each having a plurality of production wells, said system comprising a first conduit extending in a vertical direction for receiving a mixture of two fluids at a predetermined ratio of said fluids, a first housing having an inlet in flow communication with said first conduit for receiving said mixture, and at least two branch conduits extending from said housing for splitting said mixture, and respectively receiving portions of said mixture, the axes of said branch conduits extending in a spaced, parallel relation to the axis of said first conduit to reduce the effect of momentum on said predetermined ratio of said mixture as it passed through said first housing, and a second housing in each of said branch conduits for receiving said mixture therein, said second housing splitting said mixture received into a plurality of additional branch conduits each extending in a spaced parallel relationship to said axes.

11. The system of claim 10 further comprising means for varying the flow of said mixture through said branch conduits downstream of said housing, said predetermined ratio being maintained after said variance of said flow.

12. The system of claim 10 further comprising a mixer disposed in said conduits upstream of each of said splitters for mixing said fluids.

* * * * *